Oct. 7, 1947.  A. BOYAJIAN  2,428,613

TRANSFORMER

Filed Oct. 18, 1943  2 Sheets-Sheet 1

Inventor:
Aram Boyajian,
by Harry E. Dunham
His Attorney.

Oct. 7, 1947.    A. BOYAJIAN    2,428,613
TRANSFORMER
Filed Oct. 18, 1943    2 Sheets—Sheet 2
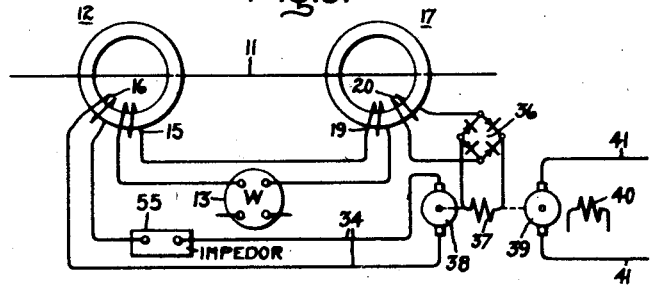
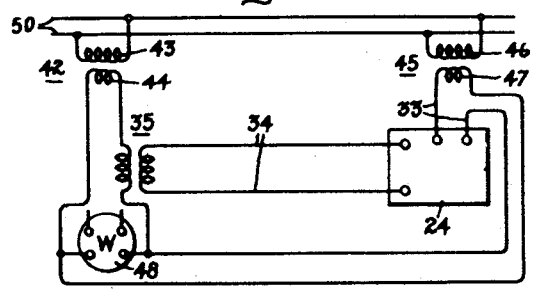
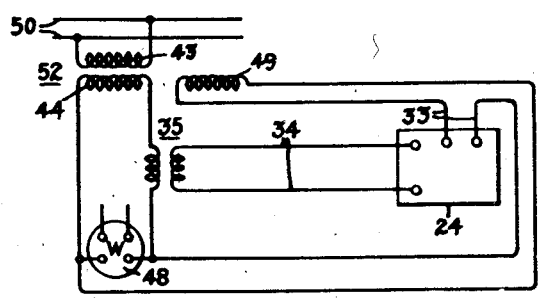
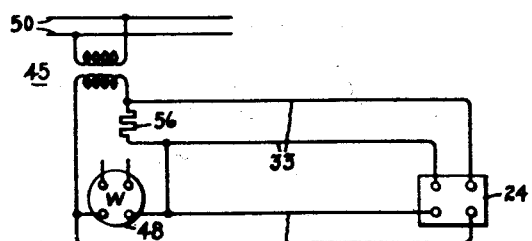
Inventor:
Aram Boyajian,
by Harry E. Dunham
His Attorney.

Patented Oct. 7, 1947

2,428,613

UNITED STATES PATENT OFFICE 2,428,613

TRANSFORMER

Aram Boyajian, Pittsfield, Mass., assignor to General Electric Company, a corporation of New York Application October 18, 1943, Serial No. 506,697

12 Claims. (Cl. 171—119)

1

My invention relates to the art of alternating-current electrical measurements and to transformer systems therefor, more particularly to instrument transformers, such as current and potential transformers, and has for its general object improvement in the accuracy characteristics of such transformers, preferably by electronic amplifier means. More specific objects and advantages of the invention will be pointed out, or will be self-evident, in the course of the description of the invention.

Figure 1:
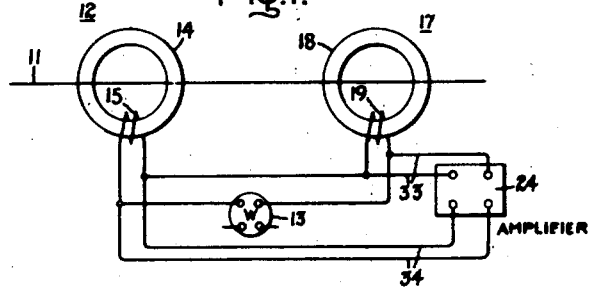
Figure 2:
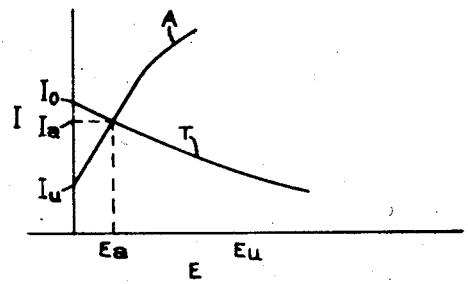
Figure 3:
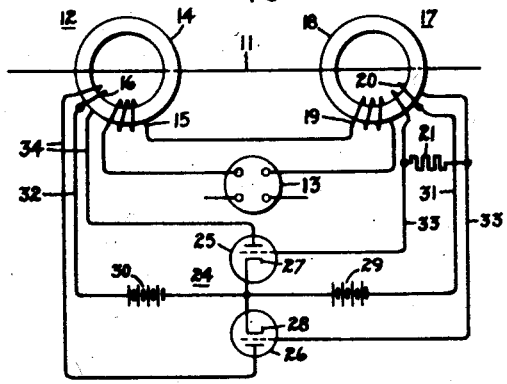
Figure 4:
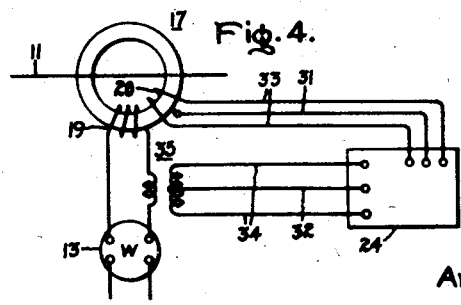

Fig. 1 represents diagrammatically one of the simpler embodiments of the invention. Fig. 2 represents some characteristic curves used in the explanation of the operation of Fig. 1. Figs. 3 and 4 are modifications of Fig. 1. Fig. 5 is a modification of Fig. 1, in which a motor generator system replaces an amplifier. Figs. 6, 7 and 8 represent diagrammatically applications of the invention to potential transformer systems.

The general theory and principles of the invention may be understood as follows:

An instrument transformer is a transformer of which the essential burden consists of instruments of measurement and control, such as voltmeters or ammeters, watt-meters, watt-hour-meters, and various kinds of relays. In such service, it is essential that the transformer deliver to its burden, especially to wattmeter and watt-hourmeter type of burdens, a transformed current or voltage very precisely proportional to and very nearly in phase with a given current or voltage to be measured. If the instrument transformer is a current transformer, the exciting current required by the device introduces either a ratio or a phase angle error, or both, in its output current, as compared with that which corresponds to the turn ratio of the transformer; and if it is a potential transformer, the voltage consumed by the leakage impedance between the input and the output lines of the transformer introduces a ratio or a phase-angle error, or both, in its output voltage, as compared with that which corresponds to the turn ratio of the transformer. These errors vary with the magnitude and power factor of the volt-ampere burden, and if the burden is zero, the error may be negligible. This fact makes it possible to obtain an indication of the magnitude and phase angle of the errors of an instrument transformer that is carrying a burden, by comparing it with one that has a similar turn ratio and is carrying substantially no burden. Then, such an indication of error makes it possible to control a generator, or amplifier or oscillator to furnish automatic correction for the error. It is also possible to go still further and furnish not only a corrective component, but the bulk of the burden volt-amperes from the amplifier or other auxiliary means, in which case, the load on the instrument transformer is correspondingly reduced and the accuracy of the transformation correspondingly increased. Other principles involved in the invention will be evident in the course of the description of the various embodiments of the invention.

Referring to Fig. 1, 11 represents a conductor carrying a current which it is desired to transform accurately through a current transformer 12 (shown as one of bushing type because it is generally difficult to secure great accuracy in this type of current transformer of conventional design), the transformed current to be delivered for measurements to an instrument 13, shown as a wattmeter, which then constitutes the burden on 12. The conductor 11 constitutes a one-turn primary winding for the current transformer 12, as a "through" conductor passing through the opening of the ring-shaped core 14 of the current transformer 12; and winding 15, constitutes a secondary or output winding therefor. I shall refer to 12 as the main current transformer. Part 17 is another, auxiliary, current transformer, which also may be of the bushing type, though not necessarily the duplicate of 12, with 11 again as its one-turn primary winding, 18 as its ring-shaped core, and 19 as its secondary winding. It is desirable (though not absolutely necessary) that the primary to secondary turn ratio of the auxiliary transformer be the same as that of the main transformer. However, the turn-ratio of the auxiliary transformer sets the current transformation ratio and should therefore be chosen accordingly. It will be seen that the two primaries are in series and so are the two secondaries, in similar polarity relationship, and that the secondary current of the transforming system is fed to burden 13. Part 24 is an amplifier of an approved conventional type, no detail of which is claimed here as an invention, and for simplicity of diagram and explanations, it is shown as a block with input terminal 33, 33, and output terminal 34, 34. A suitable amplifier system is shown in greater detail in Fig. 3. The input terminal 33, 33 of the amplifier (Fig. 1) will be seen connected across the secondary winding 19 of the auxiliary transformer, and the output terminals 34, 34 across the secondary 15 of the main transformer.

To understand the operation of this system, assume that the amplifier is disconnected. Then, the two current transformers jointly will feed the burden, and a voltage will appear across the terminals of coils 15 and 19. If now the input terminals of the amplifier are excited from coil 19, and its output terminals are connected in parallel with 15, the amplifier will feed an additional current into the output circuit of 15. This current flows into burden 13 through coil 19, and if the polarity of the amplifier connections is correct (which can be verified by reversing either its input or the output connections and observing the effect), this additional current increases, vectorially, the current in 19 (and hence that in the burden 13) closer to the desired ampere-turn balance with the primary, correcting thereby for the exciting current error in the output current of the system. If the turn ratio of the main transformer is not exactly the inverse of the desired current transformation ratio, this arrangement compensates also for its turn-ratio error.

The current contributed by the amplifier can not overcompensate or overcorrect, and this may be seen as follows. If we control the amplification factor of the amplifier starting with a low value that yields an insufficient corrective current and then gradually increase the amplification factor, we shall observe that as the correction improves and the ampere-turns of 11 and 19 balance better, the voltage across 19 (and hence across the amplifier control terminals 33, 33) becomes less, and in the limit, when full correction current is being delivered, the voltage on the amplifier control terminals would be zero and the amplifier would stop amplifying. That is, in this arrangement, the amplifier operates as a degeneratively coupled amplifier; and, for amplifiers with an indefinitely large amplification factor, the corrective current that the amplifier can furnish is self-limiting to a value slightly less than the ideal so as to have a control voltage to make its amplification possible.

The operation of the system will be more clearly understood by referring to the characteristic curves of Fig. 2. Here, T represents the transformer characteristic, namely, volts E (across 19) vs. amperes I (in 13 and 19), for an assumed current in 11. It is seen that for the optimum value, $I_o$, the value of E is zero; and if the current falls short of this optimum value, E increases as a function (not necessarily linear) of this shortage of error. Curve A is the corresponding characteristic of the amplifier, not necessarily linear, in terms of the voltage E (across 19 and hence across amplifier control terminals) vs. the current I (in coil 19 and in burden 13, and hence including the output current of the amplifier). With zero voltage at the control terminals of the amplifier (and hence zero output by the amplifier), the current I (in the burden) is the uncompensated current $I_u$ delivered exclusively by the transformers. These two curves intersect at the point ($I_a$, $E_a$), which then satisfies both the amplifier characteristic and the transformer characteristic and is the equilibrium point at which the system operates. Then, $I_a$ is the actual burden current, a little short of $I_o$, and $E_a$ is the actual control voltage at the amplifier. It will be observed that the greater the steepness of the amplifier curve A, that is, the greater the amplification factor, the closer will the actual current $I_a$ be to the optimum current $I_o$.

The accuracy of performance of the system may be stated also in terms of how small the $E_a$ can be rendered. With $E_u$ as the value of E when without the benefit of the amplifier, and $m$ as the amplification factor of the amplifier and $b$ as the fraction of the amplifier plate-circuit voltage fed back negatively to the grid circuit, $$E_a = E_u/(1+bm)$$

In the general case, the term $bm$ may be a complex number, in which case the equation defines $E_a$ vectorially. As $bm$ can easily be made very large numerically—several hundred or several thousand—$E_a$ can be rendered negligibly small numerically, in which case its phase becomes inconsequential no matter what its angular value may be.

Comparison of the foregoing with the nearest prior art known to applicant, namely, his Patent 1,743,752, dated January 14, 1930, and assigned to the same assignee, will reveal an important and novel principle of the present invention in that while the former depends on the error-indicating voltage to supply the corrective output as well as it can, in the present case the error-indicating voltage is depended upon, not to supply, but merely to control the corrective output, and thus the performance of the device is greatly improved.

In the practical application of the invention, the simple scheme of Fig. 1 may, in certain instances, exhibit some limitations. For instance, the control voltage and plate current ratings of the amplifier may not be well-suited to the requirements of the transformer system. Also, with perfect ampere-turn balance in transformer 17, the voltage across 19 may not be zero or negligible. In a bushing-type current transformer, with distributed secondary, this latter would be very nearly true, the voltage across 19 being only a negligible resistance drop; but in other types of current transformers, there may be a substantial reactance voltage across 19. Furthermore, in some instances phase adjustment may be desired. One way of removing these limitations is illustrated in Fig. 3.

In Fig. 3, each transformer has a tertiary winding: 16 on 12, and 20 on 17. Amplifier 24 is shown as a balanced amplifier, with triodes 25 and 26, grid bias battery 29, in the grid neutral line 31, plate battery 30 in the plate neutral line 32, and a phase-angle-adjustment impedor 21 connected across 20. The output of the amplifier is fed into 16, and by induction, through 15, into the circuit of coil 19 and burden 13. The plate neutral line is connected to the midpoint of 16. The number of turns of 16 can be made any value favorable to the amplifier, independently of the primary-to-secondary turn ratio of the current transformer 12. The amplifier grids are excited from 20, which then is designed with any number of turns that will yield the most favorable voltage to the grids, independently of the primary-to-secondary turn ratio of 17; and the neutral conductor 31 of the grid circuit is connected to the middle of 20. The phase-control impedor 21 is, at least to a first approximation, a resistor. How this can adjust the phase-angle correction of the system for exciting-currents of various power factors will be clear if it is considered that the current in 21 will be a transformed—secondary—current with respect to the resultant ampere-turns of the primary and secondary coils of 17 taken jointly. But that resultant ampere-turns is the exciting ampere-turns that represents the error in the burden current, and as the voltage across 21 will be in-phase with the current through it, it follows that the potential impressed on the grids will be in-phase with the exciting current causing the error, and as the output of the amplifier is or can be made in-phase with the grid-voltage, the amplifier will deliver a current in-phase with the exciting current. This holds true whether the exciting current (vs. voltage) of the two transformers is linear or non-linear, sinusoidal or non-sinusoidal; and therefore the system corrects automatically for wave-shape errors and for varying and non-linear transformer characteristics. From a rigidly mathematical standpoint, there can be a second-order error in this phase control based on the fact that in the process of transforming the exciting current (that is, the resultant ampere-turns of 11 and 19) into 20, an exciting current will be consumed and therefore there will be an exciting-current error in the exciting-current correction; but on further consideration it will be evident that this will be, like a "flea's flea," a second-order error with respect to the error that is being corrected, and therefore negligible for most purposes. If desired, this can be compensated for by slightly modifying the power-factor of 21, leaving then only a third-order error if any. The magnitude of 21 can in general be varied over a wide range without impairing the satisfactory operation of the system. With reduced values of 21, the magnitude of the second-order exciting-current error will diminish, but the magnitude of the voltage impressed on the grids of the amplifier also will diminish, and this latter tends to reduce the resultant amplification and hence the precision of correction. That is, varying the impedance 21 trades one second-order error against another. If 21 is made of a sufficiently low resistance to cause a large reduction in the terminal voltage of 20, this can be compensated for by designing 20 for a still higher open circuit voltage. The best compromise can be determined either by trial or by a laborious mathematical analysis of the various constants of the system.

It may be remarked that, theoretically, a second-order error is introduced also in transforming the corrective current, namely, the output of the amplifier, from 16 into 15. Only the phase-angle of this is important, and it may be corrected by a further slight modification of the power factor of 21.

In the modified embodiment of my invention shown in Fig. 4, only one current transformer is used, instead of two, and it is numbered as corresponding to part 17, rather than part 12, of the previous modifications, and the output of the amplifier is introduced into the circuit of 19 and 13 through a transformer 35 as shown. The electrical feature of this modification is that now the amplifier furnishes not only a corrective component to the burden but the bulk of the volt-amperes required by the burden, and in the limit practically the entire volt-amperes of the burden, the transformer 17 functioning essentially merely as setting the transformation ratio to which the output of the amplifier must conform. Hence, the identification of the current transformer with 17. The operation of this modified form may be understood better by considering that as the amplifier raises the current in the circuit of 19 towards a balance of ampere-turns with respect to 11, the voltage across 20 drops, with zero as its limit. With an amplifier of adequate output, this result can be secured with very good approximation, in which case the amplifier will be delivering the full voltage necessary to force the full current through the burden. That is, the amplifier will be delivering the full volt-ampere requirement of the burden. It follows that the reduction in the number of transformers, by the modification shown in Fig. 4, is accomplished at the price of an amplifier of much larger output than in the preceding cases. The phase-control impedor 21 of Fig. 2 may be applied here also, across 20, to good advantage.

The modification of the invention shown in Fig. 5 consists of the replacement of the electronic amplifier system of Fig. 1 with a synchronous motor-generator system. This will be of a fractional horsepower size. The voltage, indicative of the error, developed at the terminals of coil 20 is now rectified through a conventional rectifier 36, such as copper oxide or selenium or any other available type, and is delivered to the field-winding 37 of an alternating-current generator 38, driven by a synchronous motor 39 of the same number of poles as 38 and having the field winding 40 furnished from a direct-current source, and armature terminals 41, 41 fed from an alternating-current source synchronous with the current in conductor 11. The same types of curves as in Fig. 2 apply to the explanation of the operation of this modified system, curve A of Fig. 2 now representing the characteristics of the generator 38 in combination with the field and armature circuits associated therewith.

The phase-angle adjustment of this modification is accomplished to a first approximation by coupling the shafts of the motor and the generator at such a rotational angle with respect to each other as to provide the desired phase angle for the output current of the generator. A closer adjustment is then accomplished by providing an appropriate impedor 55 in series with the output circuit of the generator. This adjustment, once made, will be suitable for a wide range of variation of burden 13 at constant power factor. If the power factor of the burden is altered, the phase-angle adjustment will have to be altered accordingly.

In Fig. 6 illustrating the application of the invention to a potential transformer system, 50, 50 are a pair of alternating-current lines of which the potential difference is to be measured; 42 is a main potential transformer, with primary and secondary windings 43 and 44, respectively; and 45 is an auxiliary potential transformer, with primary and secondary windings 46 and 47, respectively, and having the same turn ratio as that of 43 to 44. Across the secondary winding 44 of the main transformer is connected a burden 48, such as the potential coil of a wattmeter, in series with a transformer 35, the function of which will be presently explained. The auxiliary potential transformer, 45, is essentially without burden and therefore of high accuracy. A comparison of its secondary output voltage with that across the burden will therefore yield an indication of the error of the latter. This comparison is accomplished by connecting 47 in series opposition with 48, through the grid-filament circuit of the amplifier system 24, whereby the difference in the terminal voltages of 47 and 48 becomes impressed on the control terminals, that is, on the grid-filament circuit, of the amplifier. The output circuit of the amplifier is connected in series with the instrument circuit, conveniently through the transformer 35 which adapts the voltage rating of the amplifier output circuit to the corrective voltage requirements of the instrument burden, and thus a corrective voltage is delivered to the output circuit of the potential transformer proportional to the error caused by the impedance drop of the main potential transformer 42 and its associated lines.

Fig. 7 is a simplification of Fig. 6, requiring but one potential transformer 52, now with three windings, a primary 43, a secondary 44, and a tertiary 49. This tertiary winding (49) is arranged on the core to link substantially the same main and leakage fluxes as the primary 43 when 49 is idle, and the principles of its design are the same as that of a potential coil in a testing transformer as well-known in the art and forms no part of the present invention. This makes the output voltage of 49, when practically idle, substantially the same as the impressed voltage of 43 (except for the resistance drop of 43 which generally is negligible compared with the total impedance drop of a high-voltage potential transformer) and permits winding 49 to be relatively of high reactance with respect to 43 and 44 and well-adapted for the provision of adequate insulation between itself and the other windings. The output lines of 49 are now connected into the system as the output lines of 47 in Fig. 6, that is, to control the amplifier, and the system operates in the same general manner as that in Fig. 6.

In the modification shown in Fig. 8, 56 is a resistor in series with the output circuit of the potential transformer 45. The voltage across this resistor is in phase with the output current of 45 and is impressed on the control terminals of amplifier 24. The output current of the amplifier, in-phase with the control voltage, will be in-phase with the output current of the potential transformer and if the output terminals of the amplifier are connected in parallel with the burden terminals in correct polarity, a portion of the burden current will come from the amplifier, reducing the current to be fed from the potential transformer 45. As this latter current is reduced, the voltage across 56 gets less, and the amplifier operates as a degeneratively coupled amplifier. With sufficient amplifying capacity in 24, practically all of the load will be carried by it, the load on 45 and hence the current through 56 will be negligible, and the impedance drop error of the output voltage of 45 correspondingly reduced or eliminated. As the current through 56 becomes negligible the resistance of 56 can be made greater and in the limit open-circuited.

It will be clear from the foregoing explanations of the invention that it is the vectorial value of the derived quantity—current or voltage—that is important; that it is the vectorial error, including the ratio and phase-angle errors, of the derived quantity that must be corrected; that the combinations described in the foregoing will accomplish the desired correction; and that any error in such correction will be a second-order error, very much smaller than the original error and capable of being rendered negligible. Furthermore, phase-angle adjustment in the system may be introduced at some other point in the network besides that shown, and any of the well-known equivalent arrangements of phase modification may be employed.

As the invention is capable of many other modifications besides those described, and as, in the light of the latter together with the explanations of their manner and principles of operation, such modifications will occur to those skilled in the art, I wish my appended claims to be understood as meaning to include all such modifications as do not depart from the spirit of my invention.

I claim:

1. In an alternating-current system, means for obtaining a derived electrical quantity in a predetermined proportionality to a given electrical quantity with a minimum of error, said means comprising, in combination, means to obtain said derived quantity from said given quantity approximately; means for producing a corrective component independently of said given quantity, means to add said corrective component to said approximate derived quantity; and means to yield an indication of the error of said derived quantity and adapted to control said corrective component to substantially reduce said error.

2. In an alternating-current system, means for obtaining a derived electrical quantity in a predetermined vectorial proportionality to a given electrical quantity with a minimum of error, said means comprising, in combination, means to obtain said derived quantity from said given quantity approximately for delivery to a burden; auxiliary means for obtaining an electrical quantity, corresponding to said given quantity more accurately, for comparison with said approximate quantity; means to effect said comparison and to yield an indication of the vectorial difference between said two derived quantities; and means responsive to said indication as a control and adapted to add a corrective component to said derived quantity, said last-mentioned means being an independently energized amplifier.

3. In an alternating-current measuring system, the combination, with means to deliver to a measuring device a derived electrical quantity approximately proportional, in a predetermined vectorial ratio, to a given electrical quantity to be measured, of independently energized means adapted and arranged to deliver to said measuring device a corrective component electrical quantity, and means responsive to the vectorial error of the total electrical quantity delivered to said burden and adapted and arranged to control the magnitude and phase of said corrective quantity to effect a substantial reduction in said error.

4. An alternating-current transforming system of high accuracy comprising, in combination, a current transformer subject to a substantial vectorial error in its output, means to yield an electrical indication as a function of said error, and means responsive to said indication and adapted independently to generate corrective volt-amperes as a function of said indication and arranged to deliver said corrective volt-amperes to said transformer to effect a substantial reduction in said error.

5. An alternating-current transforming system of high accuracy comprising, in combination, a current transformer subject to a substantial error of ratio, phase-angle or wave-shape in its output as a function of its burden; means to yield an electrical indication of said error; and separately energized amplifier means responsive to said indication and adapted to generate a corrective electrical quantity as a function of said indication and arranged to deliver said corrective electrical quantity to the output circuit of said transformer to effect a substantial reduction in said error.

6. An alternating-current transforming system of high accuracy comprising, in combination, a current transformer adapted to carry a burden and subject to a substantial error of ratio, phase angle or wave shape in its output as a function of that burden; means to yield an electrical potential as a function of said error; and electronic amplifier means arranged to be controlled by said indication and to deliver to the output of said transformer a corrective component to effect a substantial reduction in said error.

7. An alternating-current transforming system of high accuracy comprising, in combination, a main current transformer adapted to carry a burden and subject to a substantial exciting-current error in its output as a function of its burden; an auxiliary current transformer arranged to yield an electrical indication as a function of the exciting current of said main transformer; and current regulating means responsive to said indication and arranged to cause a current flow in the burden of said main transformer substantially to correct said exciting-current error.

8. An alternating-current transforming system of high accuracy comprising, in combination, a main current transformer having at least a primary and a secondary winding; an auxiliary current transformer, also having at least a primary and a secondary winding, the turn ratio of said windings of one transformer being the same as that of the other transformer, said primary windings being connected in series with each other, and said secondary windings being connected in series with each other in similar polarity relationship as said primary windings; and an amplifier means, with control terminals connected to the terminals of a winding of said auxiliary transformer, and output terminals connected in circuit with a winding on said main transformer, to substantially improve the balance between the ampere-turns of said secondary windings and the ampere-turns of said primary windings.

9. An alternating-current transforming system of high accuracy comprising, in combination, a potential transformer having a primary winding adapted to be connected to a source of voltage to be measured, a secondary winding adapted to be connected to an instrument burden, and a tertiary winding adapted to be used as a potential winding when under a negligible burden; and means having control terminals and output terminals and adapted to generate and deliver from said output terminals volt-amperes as a function of voltage impressed on said control terminals; said tertiary winding being connected in series-circuit relationship with said control terminals, and the resultant circuit being connected in parallel with said burden with their voltages in parallelism, whereby their difference will be impressed across said control terminals; said output terminals of said generating means being introduced into the circuit of said secondary winding in series-circuit relationship therewith and in a polarity whereby the output of said amplifier will be in a direction to compensate for the error of the secondary voltage of said potential transformer delivered to said burden.

10. An alternating-current transforming means of high accuracy comprising, in combination, a potential transformer having a primary winding adapted to be connected to a source of voltage, a secondary winding adapted to be connected to a burden; a resistive impedance adapted to be connected in series-circuit relationship with said secondary winding; an amplifying means, having input terminals adapted to be connected to said impedance means to receive excitation therefrom, and output terminals adapted to be connected in parallel with said burden in the polarity to substantially reduce the output current of said secondary winding and improve the accuracy of the voltage of said burden.

11. In an alternating-current measuring system, means for obtaining a desired voltage in a predetermined proportionality to a variable voltage with a minimum of error for application to a useful burden, said means comprising, in combination, a winding adapted to provide, when lightly loaded, a voltage substantially in said proportionality to said given voltage, independently energized amplifier means adapted to deliver a substantial fraction of the volt-amperes required by said burden at said desired voltage, and means including said winding adapted to control the output of said amplifier means to maintain said burden voltage substantially in said proportionality.

12. An alternating-current transforming system comprising, in combination, a potential-transformer system having at least a primary winding adapted to be connected to a source of variable voltage of which a substantially correct indication is to be obtained, a secondary winding adapted to be connected to a potential burden, an auxiliary winding having the same no-load voltage as the no-load voltage of said secondary winding, independently energized amplifier means having control terminals and output terminals and connected to deliver to said burden a volt-ampere output as a function of voltage impressed across said control terminals, said auxiliary winding being connected in circuit with said burden and said control terminals to impress across said control terminals the difference between the voltages of said auxiliary winding and of said burden.

ARAM BOYAJIAN.

REFERENCES CITED

The following references are of record in the file of this patent:

UNITED STATES PATENTS

| Number | Name | Date |
|---|---|---|
| 1,357,197 | Brooks | Oct. 26, 1920 |
| 1,743,752 | Boyajian | Jan. 14, 1930 |
| 1,904,095 | St. Clair | Apr. 18, 1933 |